Nov. 3, 1925.
H. L. DE ZENG
DIAGNOSTIC INSTRUMENT
Filed Feb. 15, 1923
1,559,558
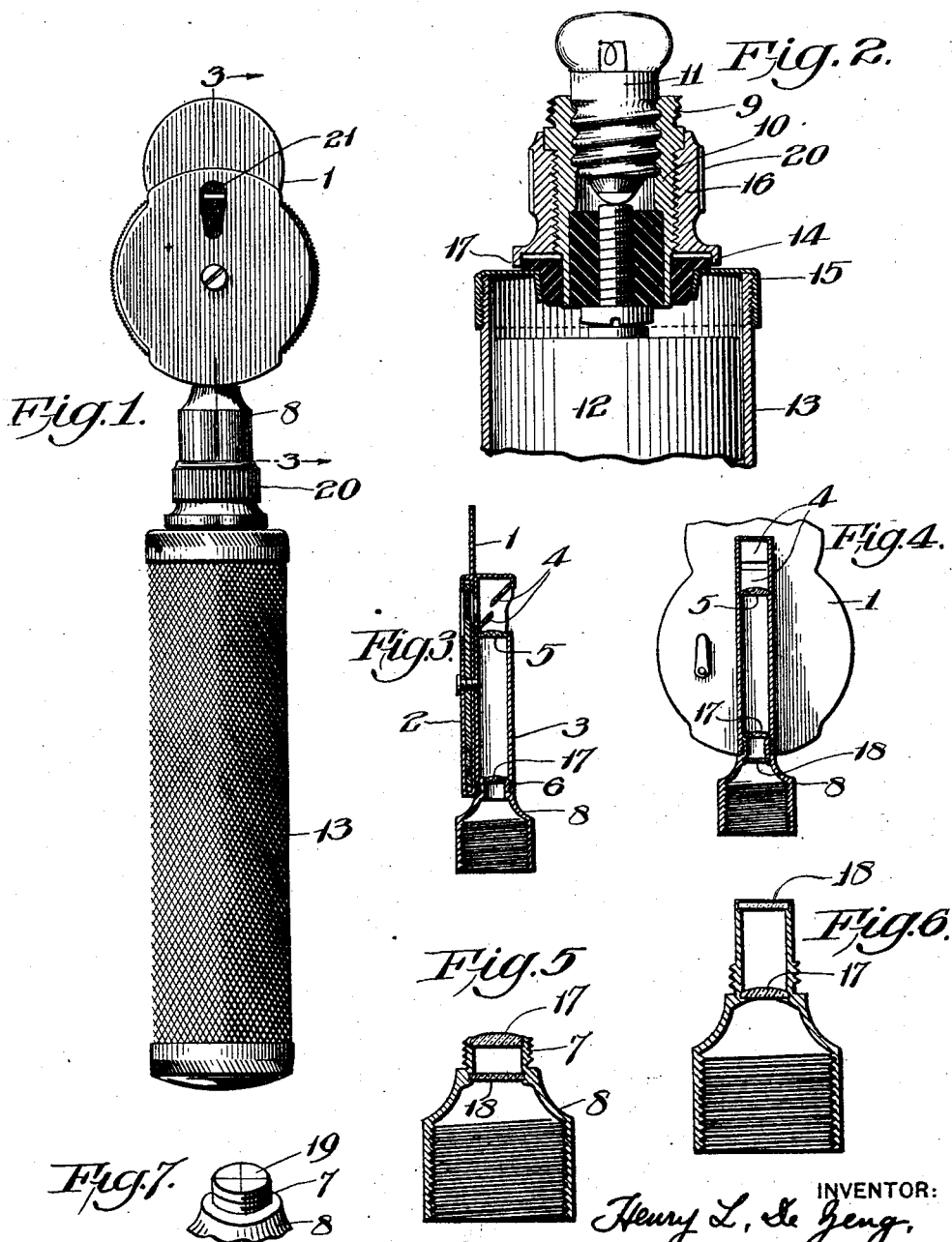

Patented Nov. 3, 1925.

1,559,558

UNITED STATES PATENT OFFICE.

HENRY L. DE ZENG, OF MOORESTOWN, NEW JERSEY, ASSIGNOR TO DE ZENG STANDARD COMPANY, OF CAMDEN, NEW JERSEY, A CORPORATION OF NEW JERSEY.

DIAGNOSTIC INSTRUMENT.

Application filed February 15, 1923. Serial No. 619,085.

*To all whom it may concern:*

Be it known that I, HENRY L. DE ZENG, a citizen of the United States, residing at Moorestown, county of Burlington, State of New Jersey, have invented a new and useful Diagnostic Instrument, of which the following is a specification.

The primary object of my invention is to devise a diagnostic instrument adapted to be employed for the examination of the eye or other parts of the body under predetermined illumination, the character or nature of which may be varied.

A further object of the invention is to produce an instrument which will produce illumination of predetermined character.

A further object of my invention is to devise a diagnostic instrument wherein the parts are interchangeable, in order to vary the nature of the illumination derived from it.

A further object of the invention is to devise a handle for a diagnostic instrument having an electric lamp and wherein novel means are provided for controlling the lamp circuit.

A further object is to provide a diagnostic instrument having interchangeable parts for not only altering the character of illumination derived from it but for projecting test objects upon the external and the internal parts of the eye or other object to be examined.

Another object is to devise a diagnostic instrument which will enable the operator to examine an eye generally and to measure it for refractive errors especially by the use of both a general illumination and a special illumination, the latter projecting a test object.

Other novel features of construction and advantage will hereinafter more fully appear in the detailed description and the appended claims.

For the purpose of illustrating my invention, I have shown in the accompanying drawings embodiments thereof which are at present preferred by me, since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in rear elevation, a diagnostic instrument, embodying my invention.

Figure 2 represents, in rear elevation, a portion of the instrument.

Figure 3 represents a section on line 3—3 of Figure 1.

Figure 4 represents, in sectional elevation, a portion of the mechanism.

Figure 5 represents, in sectional elevation, a novel construction of an interchangeable nipple or coupling employed.

Figure 6 represents, in sectional elevation, another form of nipple or coupling which can be employed.

Figure 7 represents a plan view of a test object, which is adapted to be carried by the nipple.

Similar numerals of reference indicate corresponding parts.

Referring to the drawings, 1 designates the body portion of a diagnostic instrument, embodying my invention. 2 designates a conventional lens system employed in instruments of this character. 3 designates a light tube which is carried by the body portion 1 in any desired manner. The light tube 3 carries the reflecting mirror 4 in the usual manner. The light tube is provided in the usual manner with a lens 5 and at its lower end it is internally threaded, as at 6, in order to receive the threaded portion 7 of a nipple or coupling 8. This nipple or coupling 8 is internally threaded at its lower portion in order to be received on the threaded portion 9 of the lamp holder 10 which carries the lamp 11. The lamp is electrically connected in the conventional manner with the dry cell 12 which is contained within a casing 13 which forms the grasping handle of the instrument. The lamp holder 10 has disposed between it and the top of the casing 13 an insulating ring 14, the top of the casing being formed by a cap 15 in threaded engagement with such handle. The lamp holder 10 has in threaded engagement with it an adjustable nut or sleeve 16 which is provided with a depending flange 17 adapted to contact with the cap 16 in order to close the circuit through the lamp.

It will now be understood that the nipple or coupling 8, when in position, surrounds the lamp 11 and it is provided at its upper or outer end with a lens 17 and if desired with a screen 18 so that if employed the light will shine through both the screen 18 and the lens 17. The relative position or location of the lens 17 and the screen 18 may be reversed, if desired, in the nipple, as shown in Figure 6, or the screen may be omitted, as shown in Figure 3. If it is desired to vary the nature of the illumination, this can be employed by changing the screen 18 so that any desired nature or character of illumination can be employed by interchanging the nipples or couplings, it being understood that nipples are provided having different types of screens therein. The change in the illumination may also be accomplished by changing the screen in the nipple instead of having separate interchangeable nipples, as this will accomplish the same purpose.

Different test objects such as, for example, that shown at 19, can be introduced into a nipple either with or without the screen 18 and either with or without the lens 17. The relative location of this screen can also be varied, and it can be placed anterior or posterior to either the lens or the screen, if it is employed.

This test object 19 may be composed of translucent or transparent material with characters for the stoppage of light or it may be opaque with light ports. The circuit breaking nut or sleeve 16 preferably has a portion of its outer periphery knurled to facilitate its manipulation, as indicated at 20. 21 designates a sight opening.

By the employment of an interchangeable nipple or coupling or by interchanging the parts thereof, the nature or character of the light projected by the instrument may be varied in accordance with conditions and requirements met with in practice. Furthermore, by the interchange of the nipple or component parts thereof, not only can illumination be varied, but suitable test objects may be projected upon the object to be examined for the determination of certain conditions such as the refractive errors of the eye or the location of certain objects lying within the illuminative and visual field of the instrument.

One of the chief advantages and utilities of my invention is that in a single instrument having a number of interchangeable nipples any required form of illumination may be readily interchanged by simply changing one nipple for another and, in a similar manner, any desired type of test object may be employed and one interchanged for another.

It having quite recently been recognized that examination of the eye made under the influence of illumination in different colors is productive of more expert diagnosis of pathological conditions it is advantageous to the operator to have an instrument with interchangeable nipples into which any desired light filter may be placed in keeping with both present and future requirements.

It will be apparent that when the operator desires to use the instrument, he can open or close the circuit through the lamp, as may be desired, by the use of a single hand which is employed in holding the handle, as all it is necessary to do is to adjust the circuit breaking member 16 relatively to the handle 13. In addition, this form of circuit breaker is positive and contains no delicate electrical connections which frequently become inoperative and troublesome. It is also very compact, symmetrical and not readily displaced either from a position of contact or otherwise with the handle.

It will now be apparent that I have devised a new and useful diagnostic instrument which embodies the features of advantage enumerated as desirable in the statement of the invention and the above description, and while I have, in the present instance, shown and described embodiments thereof which are at present preferred by me, and which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is:—

1. In a diagnostic instrument, a handle, a source of light, a body portion having a sight opening, a reflector adjacent to said sight opening, a casing in line with said light source and said reflector and connected with said body portion, a condensing lens in said casing and interchangeable couplings for connecting said handle with said casing, one or more of said couplings containing different light controlling means.

2. In a device of the character described, a light passage way, a source of light portion, and a series of couplers, each adapted to detachably unite the light passage way and source of light portion and a different light controlling member in each unit of the series.

3. In a device of the character described, a light passage way, a source of light portion and a detachable member connecting the light passage way and the source of light portion, and an illuminatable testing device mounted in the detachable member.

HENRY L. DE ZENG.